Oct. 17, 1944.  L. A. DOUGHTY  2,360,658
SEPARATOR FOR BATTERIES
Filed May 27, 1943
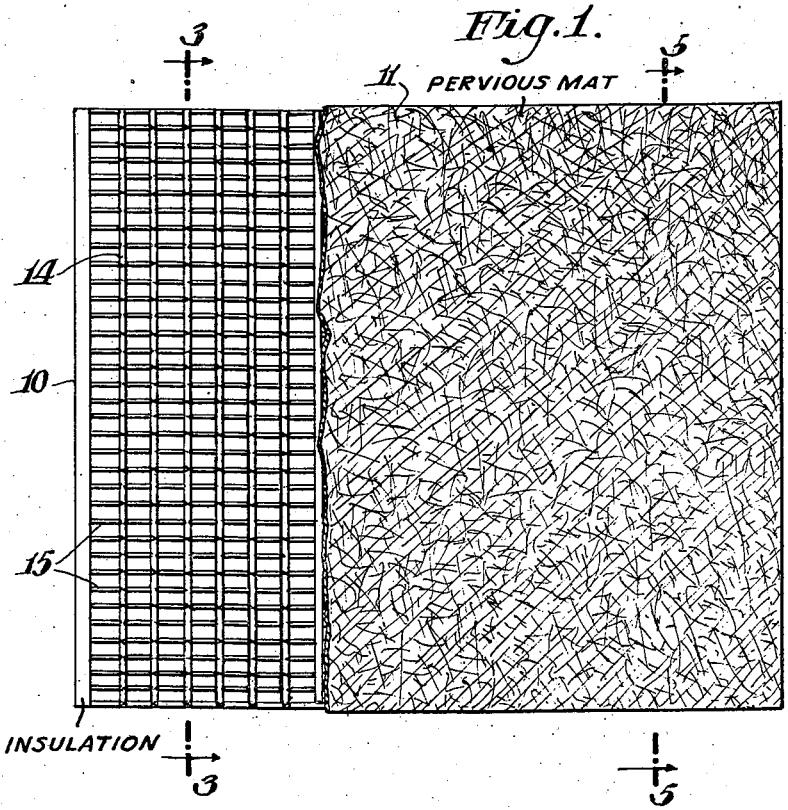
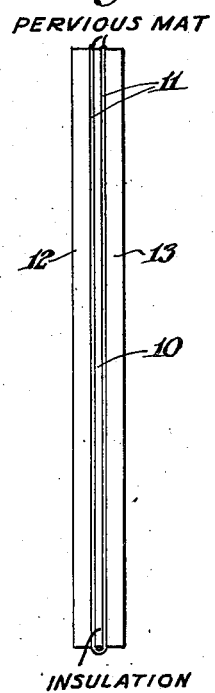
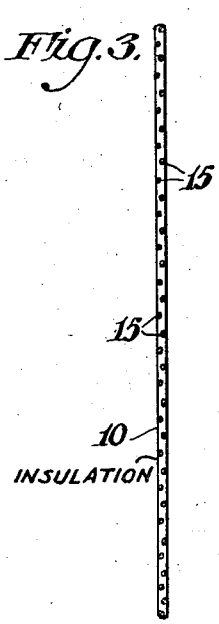
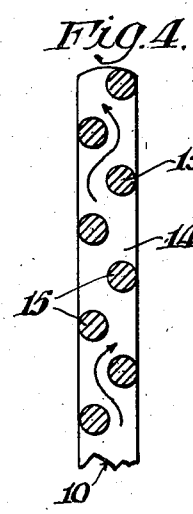
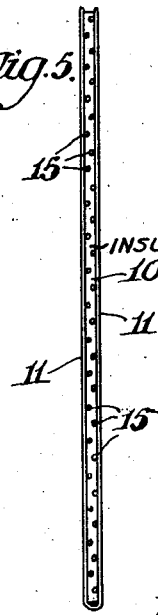
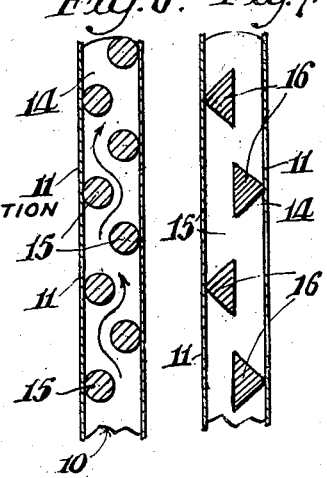
Inventor:
Leon A. Doughty,
By Barr, Onder & Fox
Attorney.

Patented Oct. 17, 1944

2,360,658

UNITED STATES PATENT OFFICE 2,360,658

SEPARATOR FOR BATTERIES

Leon A. Doughty, Glenside, Pa., assignor to Carlile & Doughty, Incorporated, Conshohocken, Pa., a corporation of Pennsylvania Application May 27, 1943, Serial No. 488,771

5 Claims. (Cl. 136—145)

The present invention relates to storage batteries and more particularly to an improved separator for such batteries.

Some of the objects of the present invention are to provide a new and novel separator for storage batteries; to provide a separator wherein provision is made for the rapid escape of gases from the cells of the battery; to provide a separator wherein obstructions to the flow of current are reduced to a minimum; to provide a multi-part separator of greater efficiency than heretofore; to provide a separator in the form of a reticulated grid; to provide a separator formed as a combination of a reticulated grid and a mat of porous material; to provide a novel multi-part separator assembly arranged to be inserted between the plates of a battery cell as a unitary structure; to provide a separator wherein a plurality of vertical channels serve as escape passages for gases; to provide a novel line contact means for a separator and an adjacent part; to provide a separator whereby in the use thereof a battery not only operates with greater efficiency but has a longer life; and to provide other improvements as will hereinafter appear.

In the accompanying drawing, Fig. 1 represents a side elevation, partly broken away, of a battery separator embodying one form of the present invention; Fig. 2 represents an end elevation of negative and positive battery plates with a separator of the present invention between the plates; Fig. 3 represents a section on line 3—3 of Fig. 1; Fig. 4 represents a fragmentary part of the section of Fig. 3 on an enlarged scale; Fig. 5 represents a section on line 5—5 of Fig. 1; Fig. 6 represents a fragmentary part of the section of Fig. 5 on an enlarged scale; and Fig. 7 represents a fragmentary detail in section and on an enlarged scale showing a modified form of the separator frame work.

Referring to the drawing, one form of the present invention consists of an insulation body 10 of lattice work construction and a mat 11 of porous material conforming generally in dimension to the body 10 against which it is laid in contact to take a position between the body 10 and the positive battery plate 12, or between the body 10 and the negative battery plate 13, or in both positions. In the preferred form shown in Fig. 2, the mat 11 has a length sufficient to permit folding it around an edge of the body 10 so that it spaces both sides of the body 10 from the respective battery plates 12 and 13. This is advantageous because it saves time in assembling the separators between the battery plates. Thus, instead of inserting the parts in two operations, both the body 10 and the mat 11 can be inserted together. As shown, the mat 11 is formed of spun glass compressed into the form of a thin, flat diaphragm to rest in contact with a face of the body 10. While the mat 11 is shown as formed of minute glass strands giving the necessary porosity, any other suitable material unattackable by battery electrolyte may be used to form the mat, as for example, porous rubber, or perforated rubber, or any other non-conductive material in sheet form arranged to permit the circulation of the electrolyte.

The body 10 is formed as a skeleton frame of insulating material having interconnected vertical parallel bars 14 and horizontal parallel ribs 15. The bars 14 are preferably diamond shaped in cross section and are relatively closely spaced to form vertically disposed channels which open at the upper ends into the space above the battery plates so that the rising gases have access to the usual venting outlets, and the circulation of electrolyte maintained. In connection with the ribs 15 it should be noted that these are preferably circular in cross section and are alternately staggered with respect to a vertical median line throughout the length of the vertical channels to thereby form a tortuous path for the gas and electrolyte as indicated by arrows in Figs. 4 and 6. The preferred diameter of the ribs 15 is such that the vertical parting line of the body 10 will be tangent to all of the ribs 15 at the inner ends of the respective bar diameters, while the outer ends of these same diameters will have a line contact at one side either with the negative plate 12 or the mat 11, which is interposed therebetween, and at the other side with the mat 11. This line contact is important because it reduces the area which normally obstructs the flow of current and hence ensures a relatively low internal resistance. The body or grid 10 is molded by means of a two-part mold, each half of which has a face provided with rib-like projections of definite shape so that the general face appearance is that of a rack. These rack faces are placed together with the projections interfitting and the molding material poured or extruded into one end to thereby fill all spaces. When set, the mold is removed and the grid is in the form here shown in the drawing.

In the modification shown in Fig. 7 the ribs 15 forming the horizontal parallel strips of the body 10 are of triangular section with the base of each in a vertical plane while the apices thereof extend alternately in opposite directions. Thus, one set of ribs 16 meet an adjacent plate or mat in line contacts while the other set of ribs 16 meet an adjacent plate or mat in line contacts, the said plates or mats being at opposite sides of the body 10 as will be understood. Also, the bases of the rows of ribs lie in the same vertical plane, in this instance the parting plane of the body 10, and therefore the ribs 16 provide an undulating path for gas to rise vertically and escape at the upper end of the separator.

The body 10 is made of any insulating material, glass, rubber, asphalt composition, ceramics, plastics, or any material capable of forming a relatively rigid skeleton frame work. This rigidity of the side and vertical bars resists any buckling of the plates and prevents one plate from touching another. Also, the horizontally disposed ribs conjointly with the vertical bars prevents the active material from bulging out when the plates attempt to grow. While in the foregoing the preferred arrangement of separator and mat is described, the invention is not limited to such specific folded mat construction but to the contrary can be arranged in various ways without departing from the invention. Thus, a mat of porous rubber can be placed against the negative plate, then the grid member, and then a spun glass against the positive plate, or this arrangement can be reversed. Also, the grid member may be the center between two mats, or again the grid member may be faced with only one mat.

It will now be apparent that a novel combination separator has been devised wherein an ingenious grid structure forms the main body of the separator and is so arranged and constructed as to facilitate the escape of gases and to permit proper circulation of the electrolyte. It should be particularly noted that the spacing of the bars and ribs of the body 10 is such that one or the other is juxtaposed to the active material in the interstices of the battery plate. While ordinarily such an arrangement might increase the internal resistance of the battery, such is not the case here because each bar and each rib, by reason of its novel sectional shape, registers with the active material in a thin line contact and hence interference with current flow is practically nil, while growing of the active material is prevented.

While several forms of the invention have been shown as illustrative forms of embodiment, it is to be understood that the invention is not limited to any specific construction, but might be applied to various forms without departing from the spirit of the invention or the scope of the appended claims.

Having thus described my invention, I claim:

1. A separator for storage batteries consisting of the combination of a porous mat formed of material unattackable by battery electrolyte, and a juxtaposed skeleton frame-work of insulating material formed by a plurality of vertical bars forming a plurality of channels for gas, and a plurality of horizontal ribs between said bars traversing said channels in staggered relation and interconnecting said bars said mat being in contact with a face of said frame-work.

2. A separator for storage batteries consisting of the combination of a porous mat formed of material unattackable by battery electrolyte and a juxtaposed skeleton frame-work of insulating material formed by a plurality of vertical bars forming a plurality of channels for gas, and a plurality of horizontal ribs between said bars traversing said channels in staggered relation and interconnecting said bars, the ribs at one side of said frame work touching said mat in a plurality of line contacts.

3. A separator for storage battery consisting of the combination of a porous mat formed of material unattackable by battery electrolyte and a juxtaposed skeleton frame-work of insulating material formed by a plurality of round vertical bars forming a plurality of channels for gas, and a plurality of round horizontal ribs between said bars traversing said channels in staggered relation and interconnecting said bars, said bars and ribs being so located as to provide line contacts between each bar and each rib and said mat, in assembled relation.

4. A separator for storage batteries consisting of the combination of a porous mat formed of material unattackable by battery electrolyte and a juxtaposed skeleton frame-work of insulating material formed by a plurality of polygonal vertical bars forming a plurality of channels for gas, and a plurality of polygonal ribs between said bars traversing said channels in staggered relation and interconnecting said bars, said bars and ribs having laterally arranged apices to contact with said mat.

5. A separator for storage batteries, comprising the combination of a skeleton frame-work of insulating material in the form of a plurality of intersecting bars and ribs spaced to provide vertical and horizontal channels, and a pervious mat formed of a material unattackable by battery electrolyte located in the path of electrolyte leaving said horizontal channels, said mat being in contact with a face of said frame-work.

LEON A. DOUGHTY.